Nov. 11, 1969  G. A. McNEILL ETAL  3,477,916
METHOD OF CONTROLLING DISTILLATION OPERATION WITH ON-OFF
CONTROL RESPONSE
Filed Jan. 4, 1967  3 Sheets-Sheet 3
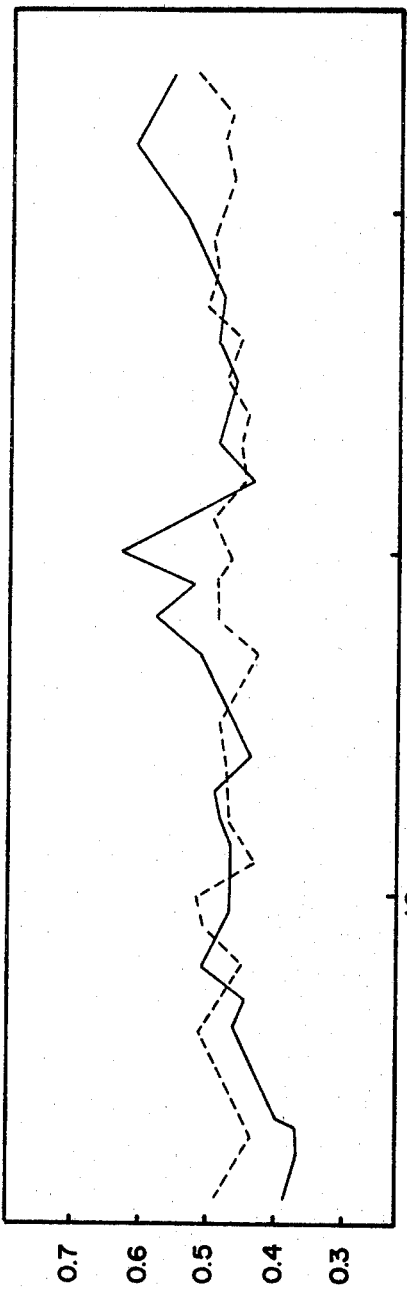
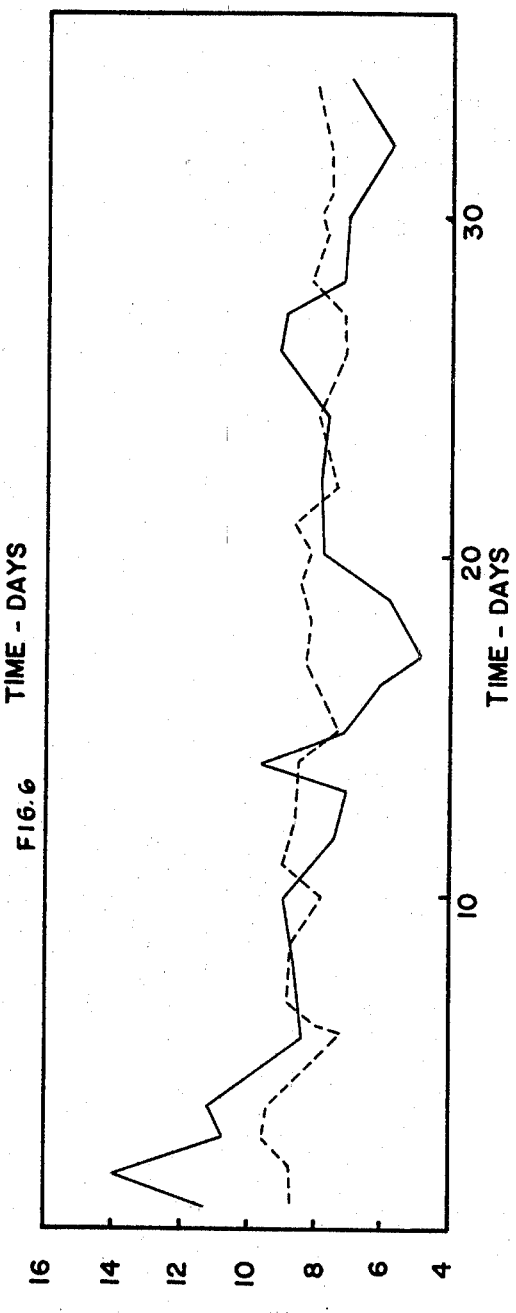
INVENTORS
George A. McNeill
Jerry D. Sacks
BY United States Patent Office 3,477,916
Patented Nov. 11, 1969

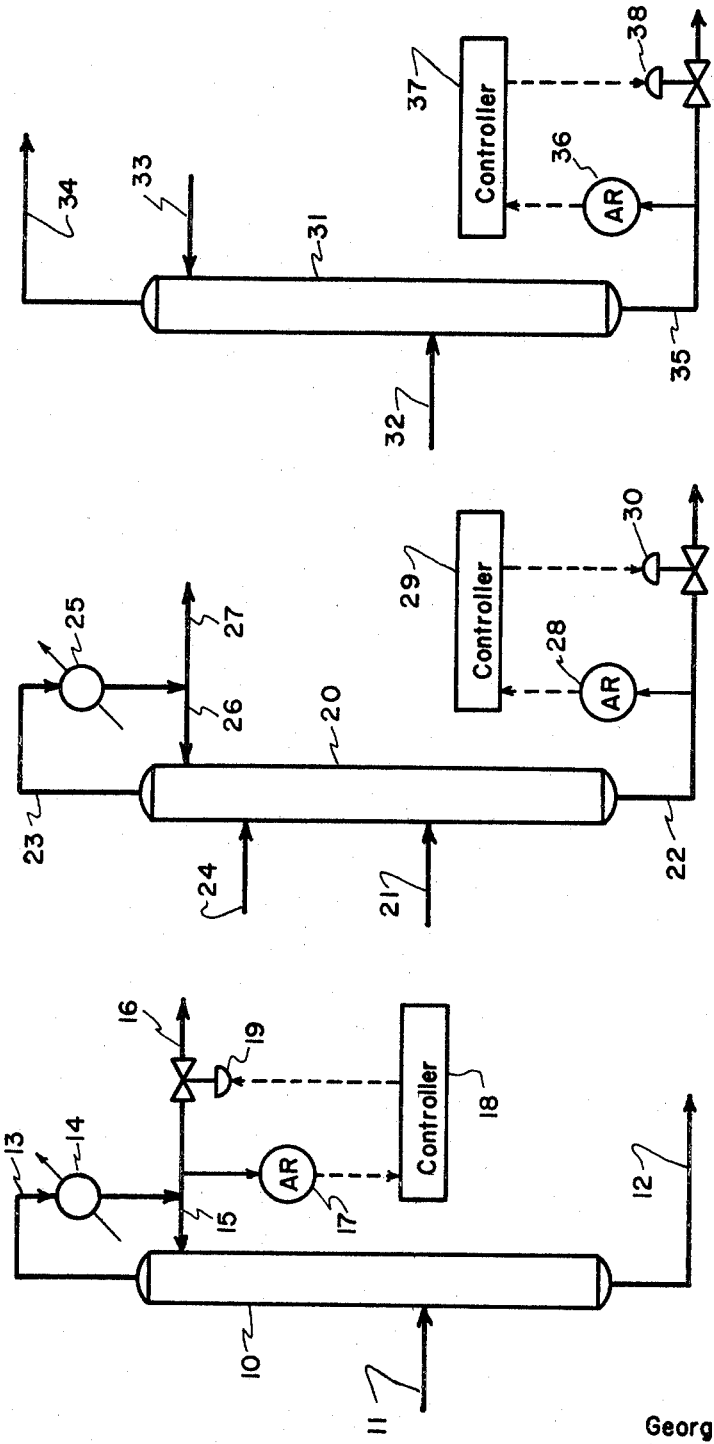

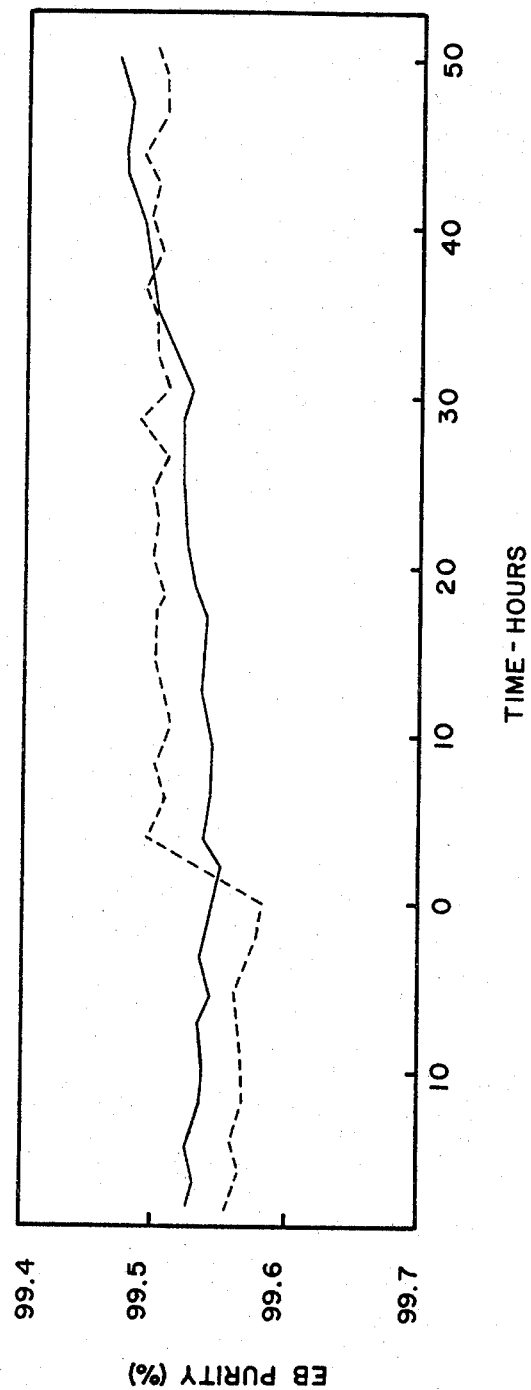

3,477,916
METHOD OF CONTROLLING DISTILLATION OPERATION WITH ON-OFF CONTROL RESPONSE
George A. McNeill, Alvin, and Jerry D. Sacks, Houston, Tex., assignors to Monsanto Company, St. Louis, Mo., a corporation of Delaware
Filed Jan. 4, 1967, Ser. No. 607,289
Int. Cl. B01d 3/42
U.S. Cl. 203—3                 4 Claims

ABSTRACT OF THE DISCLOSURE

A process for separation of mixtures by distillation, liquid-liquid extraction, and the like. The process is controlled by manipulating the flow rate of a stream of the separation zone so as to always be at one of two predetermined values. The flow rate is changed from one predetermined value to the other predetermined value in response to deviations of the purity of a product stream from a desired purity without regard to the magnitude of the deviation.

BACKGROUND OF THE INVENTION

The present invention relates to a method for the separation of a feed mixture into its various components. More particularly, it relates to a method for controlling a continuous fluid separation process.

In various chemical and petroleum operations there is a need to separate the constituents of fluid mixtures into fractions of high purity. This is often accomplished by the use of separating means such as fractional distillation, absorption, desorption, stripping and the like. Various automatic control systems for separating means have been developed in recent years to improve the efficiency of the separations. Many of these control systems have made changes in such variables in the separation zone as reflux ratio, flow rates of entering and/or exiting streams, etc., in response to measurements representative of the composition of the various streams. Such is generally the nature of the familiar feedback and feedforward control systems found throughout industry. Feedforward control utilizes a measurement representative of the composition of a feed stream entering a separation zone and makes changes or attempts to make changes in the separation zone so as to offset any upsets that could be anticipated from a change in feed composition. Feedback control, which is often combined with feedforward control, may utilize an analysis of a stream or fraction exiting a separation zone and make changes in the separation zone variables such as the reflux ratio or reboiler heat in order to maintain the composition of the streams leaving the separation zone at the desired value. Heretofore, all of these control methods have used proportional control in order to achieve the desired results; that is, the action taken by a control system to correct a deviation in the separation zone or cause a deviation in the separation zone was proportioned to the amount of deviation. While these prior art methods have provided fairly successful control of separations, their speed of recovery from an upset is limited by the need to keep settings low enough for the system to be stable. These prior art systems are particularly unsuitable for the control of very slow processes which utilize the control system to improve their speed of response. A further disadvantage of the prior art systems using proportional control is that they generally require very complicated and, thus, very expensive equipment in order to achieve the desired results. Further, prior art systems of control were not self-checking, i.e., a failure in the control system or equipment connected therewith would not be detected until the separation zone effluents had wandered so far off specification as to be extremely difficult and time consuming to correct.

SUMMARY

It is thus an object of the present invention to provide a method for the separation of fluid streams into its various components. It is also an object of the present invention to provide a method for the control of a separation system which provides fast recovery from upsets in the separation system without causing uncontrolled oscillations. Another object of the present invention is to provide a method for controlling the separation of fluid streams which allows the use of relatively simple control equipment. A still further object of the present invention is to provide a method for separating a fluid mixture with a control system which is essentially self-checking. It is also an object of the present invention to provide a method for separating fluid mixtures in a separation zone in which the desired degree of separation may be changed quickly. Additional objects will become apparent from the following description of the present invention.

The present invention in one of its embodiments is a process for the continuous separation of a feed mixture in a separation zone having a plurality of streams withdrawn from said separation zone, at least one of said streams being withdrawn from an upper region of said separation zone and at least one of said streams being withdrawn from a lower region of said separation zone, comprising passing said feed mixture to a column in said separation zone, measuring a property representative of the composition of one of said streams and manipulating the flow rate of one of said streams in response to that measurement so that said flow rate alternates such as to always be substantially at one of two, set, predetermined values. In another embodiment, the present invention is a process for producing an overhead product stream as hereinafter defined of desired purity which comprises passing a feed mixture to a distillation zone, withdrawing a first fraction from the upper region of said distillation zone, a portion of said first fraction constituting said overhead product stream, withdrawing a second fraction from the lower region of said distillation zone, returning a reflux stream to an upper region of said separation zone, measuring a property representative of the composition of said overhead product stream and in response to the measurement maintaining a first reflux ratio which has a single predetermined value when said measurement indicates that the purity of said overhead product is any value above the desired purity and maintaining a second set reflux ratio which has a single predetermined value when said measurement indicates that the purity of said overhead product is any value below the desired purity, said second reflux ratio being higher than said first set reflux ratio. The term reflux ratio as used herein is the ratio of reflux volume to net overhead product volume.

From the above embodiments it may be seen that the present invention differs from the prior art systems in that a controlled variable, i.e., the flow rate and/or the reflux ratio, of the separation system is manipulated so as to always be at either one or the other of two predetermined values without regard to the magnitude of change desired in the separation system, instead of being manipulated over a range of values with the magnitude of the manipulation being proportional to the magnitude of change desired in the separation system.

BRIEF DESCRIPTION OF THE FIGURES

FIGURE 1 is a diagram of a fractional distillation zone operated in accordance with the present invention.

FIGURE 2 is a diagram of an extractive distillation system operated in accordance with the present invention.

FIGURE 3 is a diagram of a liquid-liquid extraction operated in accordance with the present invention.

FIGURE 4 is a plot illustrating the ability of a separation zone operated in accordance with the present invention to quickly change the desired degree of separation.

FIGURES 5 and 6 are plots illustrating the ability of the present invention to maintain a desired degree of separation in a separation zone.

DESCRIPTION

In order to more fully explain the present invention, reference is made to FIGURE 1 which represents a conventional fractional distillation system wherein a single fractional distillation column is used to separate a feed mixture into two product streams of high purity wherein each of the product streams has a significantly different volatility. The feed mixture enters fractional distillation column 10 through line 11, usually at a point intermediate the ends of said column, and a bottoms product comprised of the heavier component of the feed mixture is withdrawn through line 12. An overhead fraction comprising of the lighter components of the feed mixture is withdrawn through line 13 whereupon it is condensed in condenser 14 and then divided into a reflux stream and an overhead product stream. The reflux stream is returned through line 15 to an upper region of distillation column 10 while the overhead product stream is withdrawn through line 16. Analyzer 17 analyzes the product stream to determine the composition thereof and sends a signal to controller 18 representative of the composition. Although in FIGURE 1 analyzer 17 is shown as analyzing the product stream flowing through line 16 ing the reflux stream flowing through line 15 or the it is readily apparent that the analyzer may be analyzing the reflux stream flowing through line 15 or the stream flowing through line 13 either upstream or downstream of condenser 14 and still given an analysis which is representative of the product stream flowing through line 16. Controller 18 regulates valve 19 in line 16 so as to manipulate the flow of the overhead product to be at one of two set values. It is obvious that the flow through line 16 could be controlled by a valve in line 15 and thus manipulation of the flow in a particular line or stream as referred to herein is not to be construed as limited to manipulation of a flow control means in only that particular line. This regulation of valve 19, so as to control the flow in line 16, would obviously also serve to control the reflux ratio so as to be at one of two set values. In order to produce an overhead product of a desired purity in accordance with present invention, controller 18 will control the flow rate in line 16 at the higher of the two predetermined values when the purity of the overhead product is above the desired purity, and will control the flow rate at the lower of the two predetermined values when an analysis shows the purity of the overhead product to be below the desired purity. Looking at the situation in regard to the reflux ratio, as the controlled variable, the reflux ratio will be controlled at the lower of two predetermined reflux ratio values when the overhead product is above the desired purity and will be controlled at the higher of the two values when purity of the overhead product is below the desired purity. In some situations it will be desirable to go so far as to operate the system in such a manner that there is no flow in line 16, that is to operate at total reflux, when the purity of the overhead product stream is below the desired purity. In these latter situations a product will be produced the purity of which will actually be slightly above the "desired purity" as that term is used since no product will be taken when an anlysis or other measurement representative of the composition indicates the purity of the overhead product to be below the desired purity. Thus the term "desired purity" as used herein refers to the purity at which the flow rate or reflux ratio is changed in accordance with the present invention from one of two set values to the other. The product produced when operating according to the present invention will be approximately of that "desired purity" except when operating so that one of the two set values corresponds to zero flow rate or total reflux, in which case the product produced will be slightly above the "desired purity."

FIGURE 2 shows an embodiment wherein an extractive distillation system is operated in accordance with the present invention. Referring to FIGURE 2, a feed mixture enters an intermediate region of distillation column 20 through line 21 and is separated into a bottoms product flowing through line 22 and an overhead fraction flowing through line 23. A solvent flows through line 24 and enters distillation column 20 at a point above the point of entry of the feed mixture. The overhead fraction is condensed in condenser 25 and then divided into a reflux stream flowing through line 26 and an overhead product stream flowing through line 27. Analyzer 28 analyzes the bottoms product flowing through line 22 and sends a signal to controller 29 which is representative of the composition of the bottoms product stream. Controller 29 then manipulates the flow through line 22 by means of valve 30 so as to be at one of two set values in accordance with the present invention. Controller 29 by means of valve 30 will regulate the flow of the bottoms product through line 22 in accordance with the present invention so as to be at the lower of the two set values when an analysis shows a purity of the bottoms product stream to be below the desired value and then regulate the flow so as to be in that higher of the two set values when analysis of the bottom product stream shows it to be below the desired purity. As in the case of the flow through line 16 of FIGURE 1, the flow rate through line 22 could be completely shut off when the analysis shows the purity of the bottoms product stream to be below the desired purity.

The foregoing description as to FIGURES 1 and 2 has merely been illustrative of two particular distillation systems to which the present invention may be applied and is not to be taken as limiting the present invention. The present invention is applicable to all fractional distillation systems such as those disclosed in FIGURE 5 of U.S. Patent No. 2,959,626 wherein a plurality of distillation columns operate essentially as one column. Also the present invention is applicable to fractional distillation systems wherein one or more side streams are withdrawn from an intermediate region of the column or distillation zone, and these side streams may be the ones which are manipulated and/or analyzed according to the present invention.

FIGURE 3 shows an embodiment of the present invention wherein a liquid-liquid extraction column is used to separate the components of a feed mixture in accordance with the present invention. A feed mixture enters column 31 through line 32 and a solvent with an affinity for one or more of the components of the feed mixture enters column 31 through line 33. An overhead fraction is withdrawn from column 31 through line 34 and a bottoms fraction is withdrawn through line 35. The overhead fraction is substantially richer in components of the feed mixture which are not selectively absorbed in the solvent while the bottoms fraction flowing through line 35 comprises the solvent containing components of the feed mixture absorbed therein for which it is selective. An analyzer 36 determines the composition of the bottoms fraction in line 35 and sends a signal to controller 37. In accordance with the present invention, controller 37 then manipulates valve 38 so as to manipulate the flow rate of the bottoms product in line 35 at one of two predetermined values. The flow rate will be controlled at the higher of the two flow rate values when an analysis shows the bottoms product to be too rich in the components of the feed mixture for which the solvent has an affinity.

While the foregoing has been a description of the present invention as applied to fractional distillation, extractive distillation, and liquid-liquid extraction, the present invention is applicable to practically all separations wherein the feed mixture is fed to a column of the separation zone. For example, the present invention is useful for separating mixtures by means of azeotropic distillation, stripping, desorption, absorption, and the like. Further, all of the foregoing embodiments depicted in FIGURES 1 to 3 have shown a stream withdrawn from a separation zone being manipulated in response to a measurement which is representative of the composition of that stream being manipulated. The present invention is not to be construed as to be so limited although it is preferred that the stream being manipulated in accordance with the present invention be manipulated in response to a measurement representative of the composition of that stream. For example, in the fractional distillation zone of FIGURE 1 the flow of the bottoms product in line 12 could be manipulated according to the present invention so as to be at one of two predetermined values in response to an analysis of the overhead product stream flowing through line 16. The stream being analyzed may be a different stream from the one being manipulated due to the fact that in any separation zone having at least two effluent streams, the composition of one effluent stream is indicative of the composition of the other effluent stream assuming a fairly constant feed composition. Thus, in the case of the fractional distillation of FIGURE 1, if an analysis of the bottoms product flowing through line 12 shows the composition of the bottoms product as becoming richer in the higher boiling components of the feed mixture then the product flowing through line 13 must also necessarily be getting richer in the higher boiling components of the feed mixture. Of course in most separations the purity or concentration of one of the effluent streams will be of the most concern and therefore a measurement which is representative of the composition of that stream will be made frequently, if not continuously. Further, since this stream is of the most importance, it will not only be the stream which is analyzed but will be the stream which is manipulated according to the present invention since a manipulation of that stream will generally cause a change in the composition of that stream faster than it will cause a change in the composition of any of the other streams withdrawn from the separation zone. This is due to the time lag through the columns usually employed in separating systems to which the present invention is applicable.

In practicing the present invention, the measurement which is representative of the composition of a stream can be any type measurement which will indicate the composition of a stream. The measurement can actually be a chromatographic analysis or other type analysis of the stream or can be a measurement which can be correlated to the composition of a stream. As an example of the latter type measurement it has been found that the temperature differential between a point in the lower region of a distillation zone and the reboiler inlet is relatable to the composition of the bottoms product and such a temperature differential measurement can be used in practicing the present invention. In short, there are many different types of measurements known to those skilled in the art which may be made at various areas of a separation zone so as to give an indication of the composition of a stream withdrawn from the separation zone and which may be used in the present invention. These measurements may be continuous measurements or may be made at various time intervals. Of course it is understood the time interval between two measurements should not be so great as to allow the system to deviate too much from normal.

In determining the two predetermined values for use in the present invention, whether it be the two values for the flow rate of an effluent stream from a separation zone or two reflux ratio values, one value will generally be at least 1.1 times as great as the other, although it is preferred that one value be at least three times as great as the other. The two values for a particular separation can be readily determined by one skilled in the art and will of course vary according to the volume of the mixture separated, size of the equipment used, type of feed being separated, etc. These values will generally be obtained through trial and error. The two values will be chosen so that a higher degree of separation than is desired would be effected if a controlled variable of the separation zone were held continuously at one of the values, while a lower degree of separation than desired would be effected if a controlled variable of the separation zone were held continuously at the other of the values.

While the present invention relates to the separation of practically any type mixture, it is particularly useful in the separation of a hydrocarbons such as the separation of ethylbenzene and xylene isomers or butene isomers and butadiene. Mixtures of ethylbenzene and xylene isomers are generally separated by fractional distillation so as to produce an overhead product rich in ethylbenzene and a bottoms product rich in xylenes. The fractional distillation zone for such a separation usually has at least 150 distillation stages and is one in which a portion of the initial overhead fraction is returned as reflux.

In order to demonstrate the efficacy of the present invention in separating mixtures of ethylbenzene (EB) and xylene isomers, several runs were made in the same distillation zone so as to produce an overhead ethylbenzene product of at least 99 percent purity. The separation was controlled in all the runs by regulation of the reflux ratio in response to a chromatographic analysis of the reflux stream, however some of the runs were in accordance with the present invention and some using conventional proportional control.

To describe the results of these runs, reference is made to FIGURES 4, 5, and 6. In all of these figures the dotted line represents a run made according to the present invention while the solid line represents a run made using proportional control. FIGURE 4 shows a plot of the purity of the overhead ethylbenzene versus the time and illustrates that the present invention allows fast reset of the desired degree of separation in a separation zone. In the run made according to the present invention as illustrated by the dashed line, the distillation zone was allowed to stabilize over 20 hours so as to give an ethylbenzene product of about 99.58 percent purity. After the 20 hour stabilization period, the controller was reset so as to produce an ethylbenzene of 99.50 percent purity. To produce the ethylbenzene of 99.50 percent purity, the controller controlled the separation in accordance with the present invention so that the reflux ratio was held at about 120:1 when an analysis of the overhead product indicated the purity of the ethylbenzene to be below 99.50 percent and was held at a reflux ratio of about 32:1 when the purity was above 99.50 percent. In the run using conventional proportional control, the distillation zone was allowed to line out for 20 hours at about 99.54 percent purity and then the controller adjusted so as to produce an ethylbenzene product of 99.47 percent purity. As may be seen from FIGURE 4, the distillation made according to the present invention took only 4 hours to reach and stabilize at the new value while the distillation made using proportional control took about 50 hours to make the change in the desired degree of separation.

FIGURE 5 merely shows a plot of the percent heavy impurities in the overhead ethylbenzene product while FIGURE 6 shows a plot of the percent light impurities in the bottoms product. As before, the dashed line represents a run made in accordance with the present invention however in these figures the run made in accordance with the present invention utilized two predetermined reflux ratios at 32:1 and total reflux. In both runs, the controllers were set so as to produce an overhead ethylbenzene product of about 99.50 percent purity and as may be seen from the figures, the distillation made according to the present invention clearly gave the better separation. As may be seen, the present invention does not strive to manipulate a controlled variable at that value which should produce the desired degree of separation. Instead the present invention manipulates a controlled variable to be at one of two values, neither of which would give the desired degree of separation if the controlled variable were operated at that value, i.e., one of the values would give too high a degree of separation and one too low a degree of separation. As a result, a controller used in the present invention will always be periodically changing from one value to another. It is this feature that makes the separation made in accordance with the present invention essentially self-checking. For example, in the example above, the controller changed from the higher reflux ratio to the lower reflux ratio about once per hour. An operator would immediately suspect a failure in the control system if such a change were overdue. Such is not the case where conventional proportional control is used since the nature of that type control does not require it to make any periodic change. It may also be seen that the present invention offers an advantage over the prior art in that relatively simple control equipment may be used. Typically the control could consist of an off-on switch on a bargraph recorder connected to an analyzer and a gating switch in such a manner as to produce an off or on action depending on the height of the component peak.

When separating mixtures of ethylbenzene and xylene in accordance with the present invention, it is preferred that the separation zone be maintained at total reflux when the purity of the overhead product comprising ethylbenzene is below the desired purity and that the reflux ratio be maintained at a single value which is below about 38:1 when the ethylbenzene purity exceeds the desired purity.

What is claimed is:

1. A process for producing an overhead product stream as hereinafter defined of desired purity which comprises passing a feed mixture to a distillation zone, said feed mixture selected from the group consisting of mixtures of butadiene and butene isomers and mixtures of ethylbenzene and xylene isomers, withdrawing a first fraction from the upper region of said distillation zone, condensing said first fraction, a portion of said first fraction constituting said overhead product stream, withdrawing a second fraction from the lower region of said distillation zone, returning a reflux stream to an upper region of said separation zone, measuring a property representative of the composition of said overhead product stream and in response to the measurement maintaining a first reflux ratio which has a single predetermined value above the desired purity and maintaining a second set reflux ratio which has a single predetermined value when said measurement indicates that the purity of said overhead product is any value below the desired purity, said second reflux ratio being higher than said first set reflux ratio.

2. The process of claim 1 wherein said second reflux ratio is at least three times greater than said first reflux ratio.

3. The process of claim 1 wherein said distillation zone is a fractional distillation zone.

4. A method for the separation of ethylbenzene from a mixture comprising ethylbenzene and xylene isomers to produce ethylbenzene of a desired purity, said method comprising passing said mixture to a fractional distillation zone having at least 150 distillation stages to produce an overhead product rich in ethylbenzene and a bottoms product rich in xylene isomers, analyzing said overhead product to determine the purity thereof and maintaining total reflux in said fractional distillation zone when an analysis of said overhead product shows the purity of said overhead product to be any value below the desired value, and maintaining a set reflux ratio which is a single value below about 38:1 when an analysis of said overhead product shows the purity of said overhead product to be any value above the desired purity.

References Cited

UNITED STATES PATENTS

| | | | |
|---|---|---|---|
| 2,529,030 | 11/1950 | Latchum | 203—3 |
| 2,893,927 | 7/1959 | Mertz et al. | 203—3 |
| 3,035,635 | 5/1962 | Waine et al. | 159—44 |
| 3,254,024 | 5/1966 | Huckins et al. | 203—25 |
| 3,344,040 | 9/1967 | Rijnsdorp. | |

OTHER REFERENCES

Automatic Control for Chemical Engineers, N. H. Ceaglske, pp. 30–32, New York, 1956.

Instruments and Process Control, Fink, N.Y.S.V.-P.A.A., 1945, pp. 11–18.

WILBUR L. BASCOMB, JR., Primary Examiner

U.S. Cl. X.R.

202—160, 206; 260—674, 681.5